(12) United States Patent
Zöhrer et al.

(10) Patent No.: US 8,744,205 B2
(45) Date of Patent: Jun. 3, 2014

(54) APPARATUS FOR DECOMPOSING IMAGES AND RECOMPOSING ADJUSTED IMAGES

(75) Inventors: Fabian Zöhrer, Bremen (DE); Horst Karl Hahn, Bremen (DE)

(73) Assignee: Fraunhofer Gesellschaft zur Förderung der angewandten Forschung e.V., München (DE)

( * ) Notice: Subject to any disclaimer, the term of this patent is extended or adjusted under 35 U.S.C. 154(b) by 283 days.

(21) Appl. No.: 13/162,494

(22) Filed: Jun. 16, 2011

(65) Prior Publication Data
US 2012/0321151 A1 Dec. 20, 2012

(51) Int. Cl.
G06K 9/40 (2006.01)

(52) U.S. Cl.
USPC .......................................... 382/263

(58) Field of Classification Search
USPC ........ 327/555, 558, 559; 363/47; 375/240.19; 382/173, 263, 264; 704/E19.021
See application file for complete search history.

(56) References Cited

U.S. PATENT DOCUMENTS

| | | | |
|---|---|---|---|
| 6,466,698 B1 * | 10/2002 | Creusere | 382/240 |
| 6,956,975 B2 * | 10/2005 | Young | 382/263 |
| 2004/0008904 A1 * | 1/2004 | Lin et al. | 382/275 |
| 2006/0098006 A1 * | 5/2006 | Bohm et al. | 345/418 |
| 2009/0196346 A1 * | 8/2009 | Zhang et al. | 375/240.03 |
| 2010/0046848 A1 * | 2/2010 | Witzgall et al. | 382/238 |

* cited by examiner

*Primary Examiner* — Gregory F Cunningham
(74) *Attorney, Agent, or Firm* — Lowe Graham Jones PLLC (57) ABSTRACT

An apparatus for adjusting images is provided. The apparatus comprises an image decomposing unit for decomposing an input image I into high-pass images HP1, HP2, ..., HPN and a low-pass image LPN, and an image adjusting values determining unit for determining high-pass image adjusting values $\epsilon_1, \epsilon_2, \ldots, \epsilon_N$ for adjusting the high-pass images HP1, HP2, ..., HPN and a low-pass image adjusting value $\delta_N$ for adjusting the low-pass image LPN. The apparatus further comprises an image adjusting unit for adjusting the high-pass images HP1, HP2, ..., HPN using the high-pass image adjusting values $\epsilon_1, \epsilon_2 \ldots, \epsilon_N$ and the low-pass image LPN using the low-pass image adjusting value $\delta_N$, and an image recomposing unit for recomposing the adjusted high-pass images HP1*, HP2*, ..., HPN* and the adjusted low-pass image LPN* into an adjusted image A.

14 Claims, 6 Drawing Sheets

APPARATUS FOR DECOMPOSING IMAGES AND RECOMPOSING ADJUSTED IMAGES

TECHNICAL FIELD

The present disclosure relates to an apparatus, a method and a computer program for adjusting images, in particular, a medical image such as digital mammograms.

BACKGROUND

Mammography is considered to be the most important modality in breast cancer screening and diagnosis. In dense breasts, however, the process of detecting subtle signs of cancer such as architectural distortions, masses and asymmetries is hampered by their reduced contrast in dense breast tissue. Additionally, it has been observed that an increased density of the breast is linked to a higher risk of developing breast cancer (cf. Ursin, G., et al.: Greatly Increased Occurrence of Breast Cancers in Areas of Mammographically Dense Tissue. Breast Cancer Res 7(5) (2005) R605-R608). There has been significant work on the field of mammographic image enhancement (cf., for example, Chan, H., et al.: Digital Mammography: ROC Studies of the Effects of Pixel Size and Unsharp-Mask Filtering on the Detection of Subtle Microcalcifications. Investigative Radiology 22(7) (1987) 581-589; Laine, A., et al.: Mammographic Feature Enhancement by Multiscale Analysis. IEEE Transactions on Medical Imaging 13(4) (1994) 725-739; Morrow, W., et al.: Region-Based Contrast Enhancement of Mammograms. IEEE Transactions on Medical Imaging 11(3) (1992) 392-406; Pisano, E., et al.: Image Processing Algorithms for Digital Mammography: A Pictorial Essay1. Radiographics 20(5) (2000) 1479) and it has been shown that these techniques can partly improve the detectability of important features in mammographic screening.

Nowadays, manufacturers of digital mammography systems include their proprietary post-processing algorithms to enhance digital mammograms for diagnostic presentation, which gives these processed mammograms a unique appearance and contrast. In Chen, B., et al.: Comparison of Tissue Equalization and Premium View Post-Processing Methods in Full Field Digital Mammography. European Journal of Radiology (2009), the authors compared the diagnostic abilities of two post-processing methods provided by the GE Senographe DS System, premium view (PV) and tissue equalization (TE). Their study showed that PV provided better diagnostic information compared to TE, particularly for patients with malignancy in dense breast.

During screening or therapy, patients frequently undergo examinations with mammography systems of different manufacturers. In the process of screening, a patient's current mammograms are compared to the prior mammograms in order to aid detecting changes in breast morphology, which can be an indication of a growing lesion. In Snoeren, P. and Karssemeijer, N.: Gray-Scale and Geometric Registration of Full-Field Digital and Film-Screen Mammograms. Medical Image Analysis 11(2) (2007) 146-156, the authors presented a gray-scale and geometric registration of full-field digital "for processing" mammograms to film-screen mammograms based on a parametric model of the acquisition aspects. However, in a clinical setting the availability of "for processing" images is not always granted for a number of reasons including system restrictions and external image acquisition. It would therefore be desirable to be able to automatically homogenize "for presentation" mammograms acquired with different machines and/or treated with different post-processing algorithms as this would ease the diagnostic assessment of prior-current mammogram pairs.

SUMMARY

Example embodiments provide an apparatus, a method and a computer program for adjusting images, in particular, medical images such as digital mammograms, which allow enhancing the contrast appearance of the images in order to ease the visual assessment, in particular, the diagnostic assessment, thereof.

In one embodiment, an apparatus for adjusting images is presented, wherein the apparatus comprises:
  an image decomposing unit for decomposing an input image into high-pass images and a low-pass image,
  an image adjusting values determining unit for determining high-pass image adjusting values for adjusting the high-pass images and a low-pass image adjusting value for adjusting the low-pass image,
  an image adjusting unit for adjusting the high-pass images using the high-pass image adjusting values and the low-pass image using the low-pass image adjusting value, and
  an image recomposing unit for recomposing the adjusted high-pass images and the adjusted low-pass image into an adjusted image.

By the term "low-pass image" we also refer to the term "approximation image", which describes an image usually created in the context of wavelet-filtering, multi-scale filtering or comparable methods. The approximation image may be calculated from the input image by applying an applicable low-pass filter. By the term "high-pass image" we also refer to the term "detail image", which describes an image usually created in the context of wavelet-filtering, multi-scale filtering or comparable methods to decompose an image. The detail image contains detail information of the input image like for example edge information at a certain spatial scale or frequency. The detail image may be calculated by applying an applicable high-pass filter to the input image. The detail image at a certain scale may also be calculated by subtracting the approximation image at the same scale from the input image (cf., for example, Mallat, S. G.: A Theory for Multiresolution Signal Decomposition The Wavelet Representation, IEEE Trans. On Pattern Analysis and Machine Intelligence, Vol. 11, No. 7, July 1989).

The term "adjusting value" not only refers to a single value, but may also refer to a set of values used in a function or method suitable to adjust the gray values of the respective image.

The apparatus according to example embodiments provides a multi-scale adjustment of images that allows enhancing the contrast appearance of the images on multiple scales, i.e. in multiple frequency ranges. This is advantageous because it allows to ease the visual assessment of the images in the case where important features, for example, growing lessions in digital mammograms, exist at different sizes (i.e., on different scales).

In one embodiment, it is preferred that the image is a medical image, in particular, a digital mammogram.

In one embodiment, it is preferred that the adjusting values determining unit is adapted for determining the high-pass image adjusting values based on statistical values derived from the high-pass images. By basing the determining of the high-pass image adjusting values on statistical values derived from the high-pass images, suitable high-pass image adjusting values can be automatically determined in a simple manner without a need for further input from a user. The statistical values preferably comprise a standard deviation of gray values or a mean of gray values or the like of the respective high-pass images.

In one embodiment, it is further preferred that the adjusting values determining unit is adapted for determining the high-pass image adjusting value for a respective high-pass image by determining a multiplication factor between the statistical value derived from the respective high-pass image and a corresponding joint statistical value derived jointly from the high-pass images. The statistical value derived from the respective high-pass image preferentially comprises a standard deviation of gray values or a mean of gray values or the like of the respective high-pass image and the corresponding joint statistical value derived jointly from the high-pass images preferentially comprises a joint standard deviation of the gray values or a joint mean of the gray values or the like of all the high-pass images.

In one embodiment, it is preferred that the image decomposing unit is adapted for decomposing a further input image into further high-pass images and a further low-pass image, wherein the image adjusting values determining unit is adapted for determining the high-pass image adjusting value for a respective high-pass image by determining a multiplication factor between the statistical value derived from the respective high-pass image and a corresponding statistical value derived from a corresponding further high-pass image. In this case, the apparatus can be used to automatically homogenize the contrast appearance of the input image, for example, a digital mammogram from a prior mammography examination, to the contrast appearance of the further input image, for example, a current digital mammogram from a current mammography examination (which may have been performed with a different mammography system and/or may have used different post-processing algorithms). This may allow, for example, easing the diagnostic assessment of prior-current mammogram pairs.

In one embodiment it is further preferred that the image decomposing unit is adapted to process the image and the further input image such that the input image and the further input image are of the same spatial resolution. As the above described automatic homogenization compares an input image and a further input image frequency wise, it is important for the morphology in both images to be at comparable spatial resolutions. This is preferably achieved by resampling either the input image or the further input image to match the spatial resolution of the respective other image. The filter used for the resampling is preferably a Lanczos filter, but other filters may also be used with comparable effect.

In one embodiment, it is preferred that the apparatus comprises a user interface for allowing a user to jointly set at least two high-pass image adjusting values and/or at least one high-pass image adjusting value and the low-pass image adjusting value using an adjusting function or a look-up table. Preferentially, the user interface provides a mouse interaction on a screen, a slider, a rotary knob or another suitable "one-dimensional" interaction modality, which can be set by the user to a desired scalar value, for example, a floating-point value between 0 and 1 or an integer value between 0 and 100%. A look-up table may then provide, for example, for each scalar value that can be set with the "one-dimensional" interaction modality a set of high-pass image adjusting values for two or more high-pass images. Thus, by setting the "one-dimensional" interaction modality to a desired scalar value, the user could simultaneously set—in this example—the high-pass image adjusting values for two or more high-pass images. This provides a simpler interface compared to a case where the user can only separately change each respective high-pass image adjusting value or the low-pass image adjusting value.

It shall be noted that the above-described "interactive" joint setting of at least two high-pass image adjusting values and/or of at least one high-pass image adjusting value and the low-pass image adjusting value using an adjusting function or a look-up table can also be combined with above-described automatic determination of the high-pass image adjusting values. For example, it may be advantageous to automatically determine, in a first step, the high-pass image adjusting values for all high-pass images and then, in a further step, to allow the user to jointly (re)set some of these values.

In one embodiment, it is further preferred that the apparatus comprises a cross-fading unit for generating a cross-faded image being a cross-fading of the input image and of the adjusted image. The cross-faded image is preferentially generated by multiplying the adjusted high-pass images and the adjusted low-pass image with a cross-fading value c, which can be, for example, a floating-point value between 0 and 1, and by multiplying copies of the high-pass images and a copy of the low-pass image with the value (1−c). The respective multiplied adjusted high-pass images are then added to the corresponding multiplied copies of the high-pass images to generate cross-faded high-pass images and the multiplied adjusted low-pass image is added to the corresponding copy of the low-pass image to generate a cross-faded low-pass image. The image recomposing unit then recomposes the cross-faded high-pass images and the cross-faded low-pass image into the cross-faded image. Alternatively, the cross-faded image may also be generated by multiplying the adjusted image with the cross-fading value c and the image with the value (1−c) and by adding the multiplied adjusted image to the multiplied image to generate the cross-faded image.

In one embodiment, it is preferred that the apparatus comprises a user interface for allowing a user to set a cross-fading value representing the strength of the input image or of the adjusted image in the cross-faded image. For example, the user interface preferentially allows the user to set the cross-fading value c to any desired scalar value, for example, a floating-point value between 0 and 1 or an integer value between 0 and 100%. This may be realized, for example, by means of a mouse interaction on a screen, via slider, a rotary knob or by means of another suitable "one-dimensional" interaction modality provided by the user interface. Moreover, the user interface preferentially allows the user to generate a series of cross-faded images wherein the cross-fading value c changes from one cross-faded image in the series to the next. This allows the user to continuously cross-fade from the input image (c=0, i.e., in this case, the cross-faded image corresponds to the input image) to the adjusted image (c=1, i.e., in this case, the cross-faded image corresponds to the adjusted image). Because during the process of cross-fading from the input image to the adjusted image, the gray value change is strongest in those image structures, which are changed the most by the adjustment, such a cross-fading can possibly assist the detection of features in the images. Moreover, because of the smooth transition resulting from the continuous cross-fading, there is no abrupt change between the input image and the adjusted image.

In one embodiment, it is preferred that the cross-fading unit is further adapted for generating the cross-faded image using functions of the cross-fading value c, wherein a respective function of the cross-fading value c represents the strength of a respective high-pass image or of a respective adjusted high-pass image or of the low-pass image or of the adjusted low-pass image in the cross-faded image. This allows for an even more flexible cross-fading of the input image and of the adjusted image. For example, a respective function of the cross-fading value c may be used to additionally amplify a respective high-pass image or to provide an additional gray value offset to the low-pass image.

In one embodiment, it is preferred that the high-pass image adjusting values comprise multiplication factors and the low-pass image adjusting value comprises an additive value. The adjusting, in this case, comprises multiplying the high-pass images with the respective multiplication factors, which allows to adjust their strength (and therewith their influence on the overall image contrast characteristics) and adding the additive value to the low-pass image, which allows to lower or raise the mean value of the whole image.

In one embodiment, it is further preferred that the apparatus is adapted for performing the adjusting of the high-pass images and of the low-pass image on a graphics card. This allows for a very fast implementation of the operations necessary for the adjusting. Also, it is noted that also other operations, such as the operations required for generating the cross-faded image may be performed on a graphics card.

In one embodiment, it is preferred that the apparatus comprises a user interface for allowing a user to spatially shift respective high-pass images and/or the low-pass image and/ or respective adjusted high-pass images and/or the adjusted low-pass image relative to each other. Such a relative shifting, which may be in the range of a few pixels or so, may help a user in visually distinguishing and therewith detecting subtle structures in the adjusted image.

In a further aspect of example embodiments, a method for adjusting images is presented, wherein the method comprises:
  decomposing an input image into high-pass images and a low-pass image,
  determining high-pass image adjusting values for adjusting the high-pass images and a low-pass image adjusting value for adjusting the low-pass image,
  adjusting the high-pass images using the high-pass image adjusting values and the low-pass image using the low-pass image adjusting value, and
  recomposing the adjusted high-pass images and the adjusted low-pass image into an adjusted image.

In a further aspect of example embodiments, the use of a cross-faded image for medical diagnostic assessment is presented, the cross-faded image being a cross-fading of an input image and of a frequency-adjusted version of the input image, wherein the respective strength of the input image and of the frequency-adjusted version of the input image in the cross-faded image is adjustable by a user. Preferably, the adjusting of the respective strength of the input image and of the frequency-adjusted version of the input image in the cross-faded image can be performed by means of a cross-fading value c or by means of functions of the cross-fading value c, as has been described in more detail above.

In a further aspect of example embodiments a use of cross-faded images for medical diagnostic assessment is presented, the cross-faded images being cross-fadings of an input image and of a frequency-adjusted version of the input image, wherein the cross-faded images represent a continuous transition between the input image and the frequency-adjusted version of the input image.

The term "frequency-adjusted version of the input image", as used herein, denotes a version of the input image in which the contrast appearance has been adjusted on multiple scales, i.e. in multiple frequency ranges. Such an image can preferentially be generated using the above described method for adjusting images, but other approaches, based on, for example, an FFT ("Fast Fourier Transform") or the like may also be possible.

In a further aspect of example embodiments a computer program for adjusting images is presented, the computer program comprising program code means for causing an apparatus as defined in claim 1 to carry out the steps of the method as defined in claim 14, when the computer program is run on a computer controlling the apparatus.

It shall be understood that the apparatus of claim 1, the method of claim 14, the uses of claims 15 and 16, and the computer program of claim 17 have similar and/or identical example embodiments, in particular, as defined in the dependent claims.

BRIEF DESCRIPTION OF THE DRAWINGS

In order to avoid repetitions, equal or corresponding devices, units, elements, etc. are identified by the same reference numerals as long as no further differentiation is necessary or reasonable.

DETAILED DESCRIPTION

Figure 1:
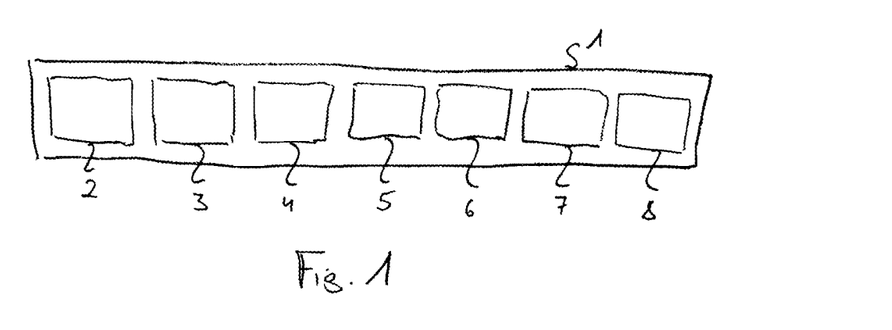
FIG. 1 shows schematically and exemplarily an embodiment of an apparatus for adjusting images.

FIG. 1 shows schematically and exemplarily an embodiment of an apparatus for adjusting images which are, in this embodiment, digital mammograms. The apparatus 1 comprises an image providing unit 2 for providing input images. The image providing unit 2, in this case, comprises a suitable storage unit, such as a hard drive, a permanent storage medium or the like, for storing digital mammograms. In other embodiments, the image providing unit 2 may additionally or alternatively also comprise a suitable image acquisition modality, such as a mammography modality, a computed tomography (CT) modality or the like. The apparatus 1 further comprises an image decomposing unit 3 for decomposing an input image into high-pass images and a low-pass image, and an image adjusting values determining unit 4 for determining high-pass image adjusting values for adjusting the high-pass images and a low-pass image adjusting value for adjusting the low-pass image. Yet further, the apparatus 1 comprises an image adjusting unit 5 for adjusting the high-pass images using the high-pass image adjusting values and the low-pass image using the low-pass image adjusting value, and an image recomposing unit 6 for recomposing the adjusted high-pass images and the adjusted low-pass image into an adjusted image.

Preferred ways in some embodiments of decomposing the input image into high-pass images and a low-pass image by the image decomposing unit 3, of adjusting the high-pass images using the high-pass image adjusting values and the low-pass image using the low-pass image adjusting value by the image adjusting unit 5, and of recomposing the adjusted high-pass images and the adjusted low-pass image into an adjusted image by the image recomposing unit 6 will be described in the following with reference to the flowchart shown in FIG. 2.

Figure 2:
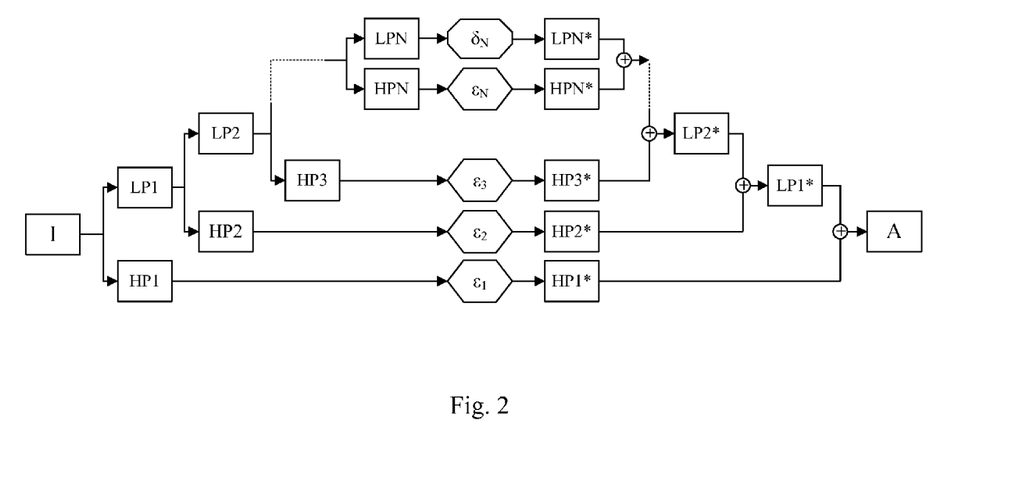
FIG. 2 shows a flowchart exemplarily illustrating certain steps that may be performed by the apparatus for adjusting images shown with reference to FIG. 1.

As shown in FIG. 2, the decomposing of the input image I (also called "original image" in the following) into high-pass images and a low-pass image by the image decomposing unit 3 preferentially comprises a number of N decomposing steps, wherein in each step n a low-pass image LPn (also called "approximation image" in the following) and a high-pass image HPn (also called "detail image" in the following) is constructed from an input image. The first approximation image LP1 is obtained by convolving the input image I two times with a Gaussian 3×3 filter kernel (a well-known blur filter) and the first detail image HP1 is obtained by subtracting the first approximation image LP1 from the input image I. The high-pass image HP1 contains the high-frequency spatial information suppressed by the blur filter. This difference of Gaussians approximates the so-called "mexican hat" wavelet. Depending on the scales and data types used, this method is numerically equivalent to a wavelet transform. Note that the first approximation image LH1 is not sub-sampled but retains its original size. The decomposing is repeated in step 2 by constructing a second approximation image LP2 and a second detail image HP2 from the first approximation image LP1. In other words, the first approximation image LP1 is used as the input image in step 2 of the decomposing. The size of the Gaussian filter kernel is increased in each decomposing step n to $2^n+1$ pixel to cover a different image frequency. By repeating the decomposing N times, a total of N high-pass images HP1, HP2, . . . , HPN at different scales and a final low-pass image LPN are obtained.

Following the decomposing, the image adjusting unit 5 adjusts the high-pass images HP1, HP2, . . . , HPN using the high-pass image adjusting values $\epsilon_1, \epsilon_2, \ldots, \epsilon_N$ and the low-pass image LPN using the low-pass image adjusting value $\delta_N$. In this embodiment, the high-pass image adjusting values $\epsilon_1, \epsilon_2, \ldots, \epsilon_N$ comprise multiplication factors, i.e. weighting factors, and the low-pass image adjusting value $\delta_N$ comprises an additive value, i.e. an offset value. The adjusting, in this case, comprises multiplying the high-pass images HP1, HP2, . . . , HPN with the respective multiplication factors $\epsilon_1, \epsilon_2, \ldots, \epsilon_N$ to adjust their strength (and therewith their influence on the overall image contrast characteristics) and adding the additive value $\delta_N$ to the low-pass image LPN to lower or raise the mean value of the whole image. The adjusting yields in the adjusted high-pass images HP1*, HP2*, . . . , HPN* and the adjusted low-pass image LPN*.

After the adjusting, the image recomposing unit 6 recomposes the adjusted high-pass images HP1*, HP2*, . . . , HPN* and the adjusted low-pass image LPN* into an adjusted image A (also called "enhanced image" in the following). The recomposing, in this case, comprises adding the adjusted high-pass images HP1*, HP2*, . . . , HPN* to the adjusted low-pass image LPN*. If the input image I comprises a discernable foreground object, such as the breast in a digital mammogram, a mask covering only pixels corresponding to the foreground object may additionally be derived from the input image I and applied to the adjusted image A such that gray values of background pixels are not adjusted, i.e. remain unchanged.

Referring back to FIG. 1, we will now describe different ways of determining the high-pass image adjusting values $\epsilon_1, \epsilon_2, \ldots, \epsilon_N$ and the low-pass image adjusting value $\delta_N$. In this embodiment, the apparatus 1 comprises a user interface 8 for allowing a user to jointly set at least two high-pass image adjusting values $\epsilon_n$ and/or at least one high-pass image adjusting value $\epsilon_n$ and the low-pass image adjusting value $\delta_N$ using an adjusting function or a look-up table. For example, the user interface may provide a mouse interaction on a screen, a slider, a rotary knob or another suitable "one-dimensional" interaction modality, which can be set by the user to a desired scalar value, for example, a floating-point value between 0 and 1 or an integer value between 0 and 100%. A look-up table may then provide for each scalar value that can be set with the "one-dimensional" intereaction modality a set of high-pass image adjusting values $\epsilon_n$ for two or more high-pass images HPn. Thus, by setting the "one-dimensional" interaction modality to a desired scalar value, the user can simultaneously set—in this example—the high-pass image adjusting values $\epsilon_n$ for two or more high-pass images HPn. It is noted that in this case, the image adjusting values determining unit 4 can simply be adapted for determining the high-pass image adjusting values $\epsilon_1, \epsilon_2, \ldots, \epsilon_N$ and the low-pass image adjusting value $\delta_N$ by "retrieving" these values from the look-up table (and/or by providing some or more default values, if necessary). It is further noted that the user interface 8 may also allow the user to separately change each respective high-pass image adjusting value $\epsilon_n$ or the low-pass image adjusting value $\delta_n$.

As an alternative to the above described "interactive" setting of the high-pass image adjusting values $\epsilon_1, \epsilon_2, \ldots, \epsilon_N$ and of the low-pass image adjusting value $\delta_N$ by the user, the image adjusting values determining unit 4, in this embodiment, is adapted for determining the high-pass image adjusting values $\epsilon_1, \epsilon_2, \ldots, \epsilon_N$ based on statistical values derived from the high-pass images HP1, HP2, . . . , HPN. The statistical values preferably comprise a standard deviation of gray values or a mean of gray values or the like derived from the high-pass images HP1, HP2, . . . , HPN. In particular, the image adjusting values determining unit 4, in this embodiment, is adapted for determining the high-pass image adjusting value $\epsilon_n$ for a respective high-pass image HPn by determining a multiplication factor between the statistical value derived from the respective high-pass image HPn (here the mean of the gray values in HPn) and a corresponding joint statistical value derived jointly from the high-pass images HP1, HP2, . . . , HPN (here the joint mean of the gray values of HP1, HP2, . . . , HPN, i.e. the mean of the means of the gray values of HP1, HP2, . . . , HPN, respectively).

In this embodiment, the image decomposing unit 3 is adapted for decomposing a further input image FI into further high-pass images FHP1, FHP2, . . . , FHPN and a further low-pass image LFPN and the image adjusting values determining unit 4 is adapted for determining the high-pass image adjusting value $\epsilon_n$ for a respective high-pass image HPn by determining a multiplication factor between the statistical value derived from the respective high-pass image HPn and a corresponding statistical value derived from a corresponding further high-pass image FHPn. The decomposing of the further input image FI into further high-pass images FHP1, FHP2, . . . , FHPN and a further low-pass image FLPN is not shown in the figures, but is preferentially performed in the same way as the above described decomposing of the input image I. The statistical value derived from a respective high-pass image HPn, for example, from the high-pass image HP1, and the corresponding statistical value derived from a corresponding further high-pass image FHPn, for example, from the further high-pass image FHP1, preferentially comprise a standard deviation of gray values or a mean of gray values or the like (here the mean of the gray values in HPn resp. FHPn).

In a similar way, the low-pass image adjusting value $\delta_N$ for the low-pass image LPN can be determined by determining an additive factor between a statistical value derived from the low-pass image LPN and a corresponding statistical value derived from the further low-pass image FLPN. Also the statistical value derived from the low-pass image LPN and the corresponding statistical value derived from the further low-pass image FLPN preferentially comprise a standard deviation of gray values or a mean of gray values or the like (here the mean of the gray values in LPN resp. FLPN).

It is noted that in this embodiment the image decomposing unit 3 is adapted to process the input image I and the further input image FI such that the input image I and the further input image FI are of the same spatial resolution. In this embodiment, this is done by resampling either the input image I or the further input image FI to match the spatial resolution of the respective other image. The filter used for the resampling is a Lanczos filter, but other filters may also be used with comparable effect.

The apparatus 1, in this embodiment, comprises a cross-fading unit 7 for generating a cross-faded image CF being a cross-fading of the input image I and of the adjusted image A. The cross-faded image CF is generated by multiplying the adjusted high-pass images HP1*, HP2*, ..., HPN* and the adjusted low-pass image LPN* with a cross-fading value c, which, in this embodiment, is a floating-point value between 0 and 1, and by multiplying copies of the high-pass images HP1, HP2, ..., HPN and a copy of the low-pass image LPN with the value (1−c). The respective multiplied adjusted high-pass images c·HP1*, c·HP2*, ..., c·HPN* are then added to the corresponding multiplied copies of the high-pass images (1−c)·HP1, (1−c)·HP2, ..., (1−c)·HPN to generate cross-faded high-pass images c·HP1*+(1−c)·HP1, c·HP2*+(1−c)·HP2, ..., c·HPN*+(1−c)·HPN and the multiplied adjusted low-pass image c·LPN* is added to the corresponding multiplied copy of the low-pass image (1−c)·LPN to generate a cross-faded low-pass image c·LPN*+(1−c)·LPN. The image recomposing unit 6 then recomposes the cross-faded high-pass images c·HP1*+(1−c)·HP1, c·HP2*+(1−c)·HP2, ..., c·HPN*+(1−c)·HPN and the cross-faded low-pass image c·LPN*+(1−c)·LPN into the cross-faded image CF. The cross-fading value c, in this case, represents the strength of the adjusted image A in the cross-faded image CF, whereas the value (1−c) represents the strength of the input image I in the cross-faded image CF.

For example, if the cross-fading value c is 0, the strength of the adjusted image A in the cross-faded image CF is also 0 and the strength of the input image I in the cross-faded image CF is (1−0)=1, i.e., in this case, the cross-faded image CF corresponds to the input image I. Likewise, if the cross-fading value c is 1, the strength of the input image I in the cross-faded image CF is (1−1)=0 and the strength of the adjusted image A in the cross-faded image CF is 1, i.e., in this case, the cross-faded image CF corresponds to the adjusted image A. To give a third example, if the cross-fading value c is 0.5, the strength of the adjusted image A in the cross-faded image CF is 0.5 and the strength of the input image I in the cross-faded image CF is also (1−0.5)=0.5, i.e., in this case, both the adjusted image A and the input image I are given equal strength in the cross-faded image CF.

The apparatus 1, in this embodiment, comprises a user interface 8 for allowing a user to set a cross-fading value c representing the strength of the adjusted image A in the cross-faded image CF. The user interface 8 allows the user to set the cross-fading value c to a desired scalar value, for example, a floating-point value between 0 and 1 or an integer value between 0 and 100%. This may be realized, for example, by means of a mouse interaction on a screen, via slider, a rotary knob or by means of another suitable "one-dimensional" interaction modality provided by the user interface 8. Moreover, the user interface 8 allows the user to generate a series of cross-faded images wherein the cross-fading value c changes from one cross-faded image CF in the series to the next. This allows the user to continuously cross-fade from the input image I (c=0, i.e., in this case, the cross-faded image CF corresponds to the input image I) to the adjusted image A (c=1, i.e., in this case, the cross-faded image CF corresponds to the adjusted image A).

In this embodiment, the cross-fading unit 7 is further adapted for generating the cross-faded image CF using functions fHP1(c), fHP2(c), ..., fHPN(c), fLPN(c) of the cross-fading value c, wherein a respective function fHPn(c), fLPN(c) of the cross-fading value c represents the strength of a respective high-pass image HPn or a respective adjusted high-pass image HPn* or of the low-pass image LPN or of the adjusted low-pass image LPN* in the cross-faded image CF. For example, a respective function fHPn(c), fLPN(c) of the cross-fading value c may be used to additionally amplify a respective high-pass image HPn or to provide an additional gray value offset to the low-pass image LPN.

It shall be noted that the user interface 8, in this embodiment, also allows a user to spatially shift respective high-pass images HPn and/or the low pass image LPN and/or respective adjusted high-pass images HPn* and/or the adjusted low-pass image LPN* relative to each other. Such a relative shifting, which may be in the range of a few pixels or so, may help a user in visually distinguishing and therewith detecting subtle structures in the adjusted image.

Figure 3:
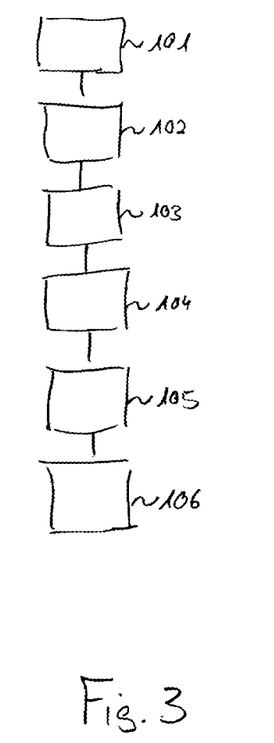
FIG. 3 shows a flowchart exemplarily illustrating an embodiment of a method for adjusting images.

In the following an embodiment of a method for adjusting images, in this embodiment, digital mammograms, will exemplarily be illustrated with reference to a flowchart shown in FIG. 3.

In step 101, the image providing unit 2 provides an input image II. In step 102, the image decomposing unit 3 decomposes the input image II into high-pass images HPn and a low-pass image LPN. In step 103, the image adjusting values determining unit 4 determines high-pass image adjusting values $\epsilon_n$ for adjusting the high-pass images HPn and a low-pass image adjusting value $\delta_N$ for adjusting the low-pass image LPN. In step 104, the image adjusting unit 5 adjusts the high-pass images HPn using the high-pass adjusting values $\epsilon_n$ and the low-pass image LPN using the low-pass image adjusting value $\delta_N$. In step 105, the image recomposing unit 6 recomposes the adjusted high-pass images HPn* and the adjusted low-pass image LPN* into an adjusted image AI. In step 106, the image display unit 7 displays the adjusted image AI.

To assess the usability of the above described apparatus 1 resp. method for adjusting images, a user preference study was performed. This study as well as exemplary results will be described in the following with reference to FIGS. 4 to 6.

For the study, a set of digital mammograms was acquired at Boca

Raton Community Hospital with a Senographe DS system from GE Medical Systems and a Hologic LORAD Selenia system. The available post-processing methods for the Senographe DS were "proc 1" (P1) and "premium view" (PV), while there was only one post-processing (HP) available for the Hologic images. The set featured 50 mammograms of eight patients, who underwent annual screenings. Five patients were scanned with a GE system with P1 and PV post-processing, while three patients additionally had scans on a Hologic system.

As the detectors of the mammography systems differ in size and number of detector elements, the digital mammograms were different in their pixel sizes (Hologic: $0.07^2$ mm$^2$ and GE: $0.094^2$ mm$^2$) and spatial resolution (Hologic: 3310× 2728 pixel and GE: 1914×2294 pixel). As a result, the breast and its morphology is displayed in a higher resolution and thus by more pixels in the Hologic images. As the above described automatic homogenization compares an input image I and a further input image FI frequency wise, it is important for the morphology in both images to be at comparable spatial resolutions. For the determination of the high-pass image adjusting values $\epsilon_1, \epsilon_2, \ldots, \epsilon_N$ and of the low-pass image adjusting value $\delta_N$, the current mammogram (in this case, the further input image FI) was resampled by using Lanczos interpolation to fit the spatial resolution of the prior mammogram (in this case, the input image I). Note that for viewing, the current mammogram was not resampled.

Often, the appearance of the mammograms' gray values is changed for the presentation on the screen by applying a sigmoid LUT ("look-up table") on the graphics card. The DICOM tags ("Digital Imaging and Communications in Medicine") of GE (P1 and PV) mammograms featured sigmoid representation with different options (softer, normal, harder), while the Hologic gray values seemed to be post-processed already in this fashion and were displayed in a linear LUT. The LUT information of the "normal" sigmoid found in the DICOM tags was therefore applied to the gray values of both GE image types to take into account the way the images should be displayed based on the DICOM information.

A user preference study was then conducted to evaluate the automatic homogenization of current-prior mammograms on the one hand and the smooth transition between the originally processed and the adjusted mammograms on the other hand. At the beginning, both current and prior mammograms were displayed in original "for presentation" view, i.e. as they would be seen in any digital mammography reading station. The prior could be switched via mouse click from original to the adjusted image and back again. After viewing a current-prior pair, the reader had to decide whether to view the prior mammogram of the next pair either in its original or the adjusted representation. Cross-fading between original and adjusted images was achieved via replacing the original mammogram on a graphics card between 0 and 100% with the adjusted image. This cross-fading could be handled manually via mouse interaction. Note that this study was not held in a clinical setting, the room was not darkened and a standard 23" TFT color monitor was used for viewing. However, it was possible to view the mammograms in full resolution mode and to zoom into and out of the images.

Figure 4:
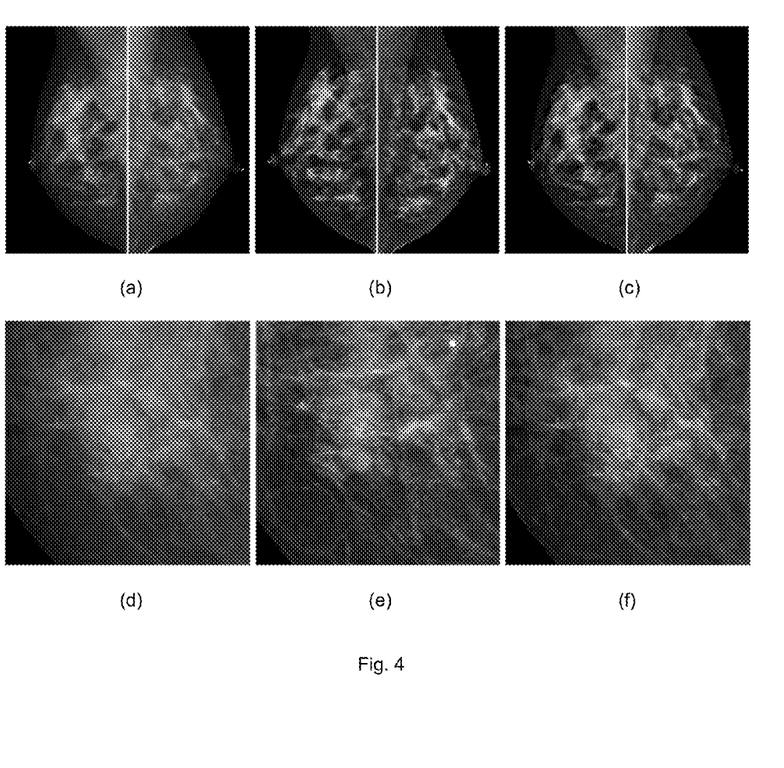
FIGS. 4 to 6 show exemplary results from a user preference study that was performed to assess the usability of the apparatus resp. method for adjusting images shown and illustrated with reference to FIGS. 1 to 3.
Figure 5:
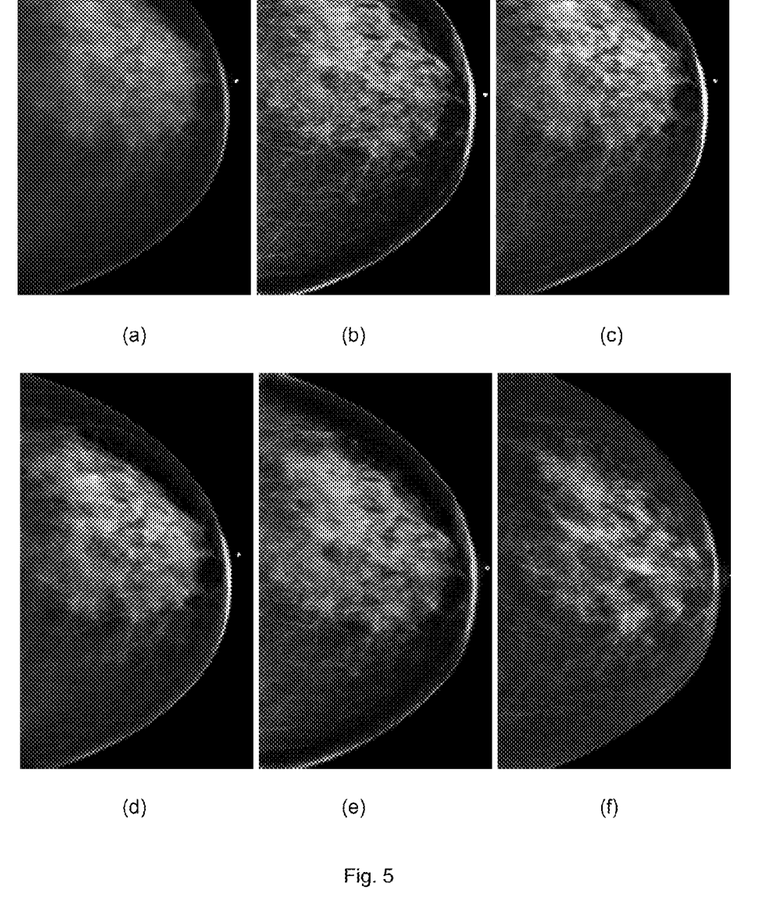

The automatic homogenization was evaluated by four experienced readers (two US American, two European) for a series of current-prior mammogram pairs of different post-processing types or systems. After viewing the first current-prior pair in both original and adjusted setting, all readers preferred to start viewing the next pair with the adjusted prior. Two readers stated that it would be enough to see the priors only in the adjusted mode, while the two others wished for the option to change back to original view. FIGS. 4 and 5 show the results of the automatic homogenization of prior to current mammograms. Window and level settings for the original and adjusted images are accordant to the DICOM tags.

The upper row of FIG. 4 shows the automatic homogenization between original GE P1 prior (a) and GE PV current (b) MLO ("Mediolateral Oblique View") pairs. Image (c) shows the results of the automatic homogenization of the contrast characteristics of the prior P1 mammograms to the current PV mammograms. The lower row features close ups of an original GE P1 prior (d) and a GE PV current (e) and again the result (f) of the automatic homogenization of the contrast characteristics is shown.

These six images of FIG. 5 display three original mammograms of the same breast and the results of three different automatic homogenizations of the contrast appearances between these current-prior mammograms. All three original mammograms feature a different original post-processing and were acquired during annual screening starting with the GE "proc 1" (P1) and followed by the Hologic (HP) and the GE "premium view" (PV) mammograms. Image (c) shows the result of the automatic homogenization of the contrast characteristics of the P1 prior (a) to the HP follow up (b), while images (d) and (e) show the result of the automatic homogenization of the original P1 (a) and HP (b) mammograms to the PV (f) current mammogram.

Figure 6:
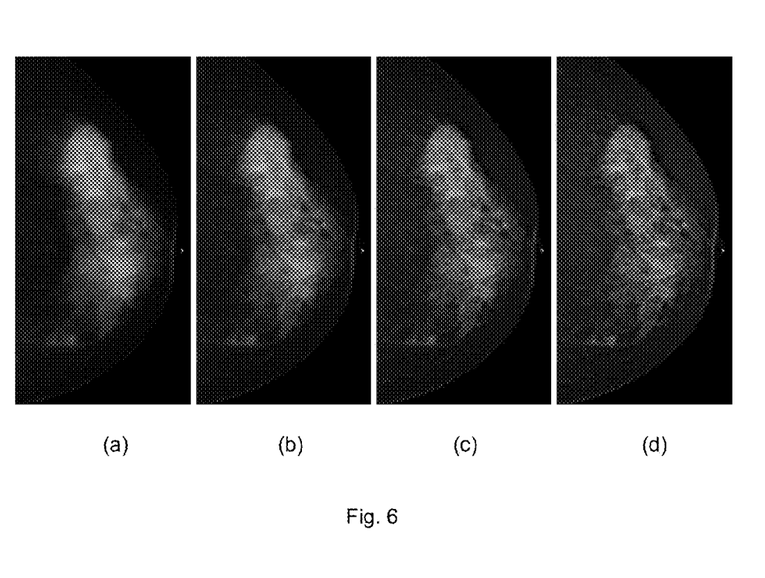

The cross-fading between original and adjusted images was also evaluated by the four readers. While the enhancement of dense areas was appreciated, the main aim was to evaluate the value of an interactive tool to continuously change the degree of enhancement. The reduction to one parameter was especially appreciated as a possible alternative to the two dimensional window/level intereaction. FIG. 6 shows four different steps in the smooth transition from an original GE PV mammogram (a) to the fully adjusted image (d). Images (b) and (c) show the strength of the adjusted image in the cross-faded image at 33% and 66%. The transition is handled interactively via mouse interaction.

Other variations to the disclosed embodiments can be understood and effected by those skilled in the art in practicing example embodiments, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Determinations like the determination of the high-pass image adjusting values $\epsilon_1, \epsilon_2, \ldots, \epsilon_N$, the adjusting of the high-pass images HP1, HP2, . . . , HPN using the high-pass adjusting values $\epsilon_1, \epsilon_2, \ldots, \epsilon_N$, et cetera, performed by one or several units or devices can be performed by any other number of units or devices. For example, steps 103 and 104 can be performed by a single unit or by any other number of units. The steps in accordance with the method for adjusting images can be implemented as program code means of a computer program and/or as dedicated hardware.

A computer program (computer instructions, computer program product, etc.) may be stored/distributed on a suitable computer-readable medium, such as an optical storage medium or a solid-state medium, supplied together with or as part of other hardware, but may also be distributed in other forms, such as via the Internet or other wired or wireless telecommunication systems.

From the foregoing it will be appreciated that, although specific embodiments have been described herein for purposes of illustration, various modifications may be made without deviating from the spirit and scope of the invention. Also, the methods and systems discussed herein are applicable to differing protocols, communication media (optical, wireless, cable, etc.) and devices (such as wireless handsets, tablets, electronic notebooks, electronic organizers, personal digital assistants, portable email machines, game machines, pagers, navigation devices such as GPS receivers, etc.).

The invention claimed is:

1. An apparatus for adjusting images, comprising:
an image decomposing unit for decomposing an input image into high-pass images (HP1, HP2, . . . , HPN) and a low-pass image (LPN) and for decomposing a further input image into further high-pass images (FH1, FHP2, . . . , FHPN) and a further low-pass image (FLPN);
an image adjusting values determining unit for determining high-pass image adjusting values ($\epsilon_1, \epsilon_2, \ldots, \epsilon_N$) for adjusting the high-pass images (HP1, HP2, . . . , HPN) and a low-pass image adjusting value ($\delta_N$) for adjusting the low-pass image (LPN), wherein the image adjusting values determining unit is adapted for determining the high-pass image adjusting values ($\epsilon_1, \epsilon_2, \ldots, \epsilon_N$) based on statistical values derived from the high-pass images HP1, HP2, . . . , HPN), wherein the high-pass image adjusting value ($\epsilon_n$) for a respective high-pass image (HPn) is determined by determining a multiplication factor between the statistical value derived from the respective high-pass image (HPn) and a corresponding statistical value derived from a corresponding further high-pass image (FHPn);
an image adjusting unit for adjusting the high-pass images (HP1, HP2, . . . , HPN) using the high-pass image adjusting values ($\epsilon_1, \epsilon_2, \ldots, \epsilon_N$) and the low-pass image (LPN) using the low-pass image adjusting value ($\delta_N$); and
an image recomposing unit for recomposing the adjusted high-pass images (HP1*, HP2*, . . . , HPN*) and the adjusted low-pass image (LPN*) into an adjusted image.

2. The apparatus of claim 1, wherein the adjusting values determining unit is adapted for determining the high-pass image adjusting value ($\epsilon_n$) for a respective high-pass image (HPn) by determining a multiplication factor between the statistical value derived from the respective high-pass image (HPn) and a corresponding joint statistical value derived jointly from the high-pass images (HP1, HP2, . . . , HPN).

3. The apparatus of claim 1 wherein the image decomposing unit is adapted to process the input image and the further input image such that the input image and the further input image are of the same spatial resolution.

4. The apparatus of claim 1 wherein the apparatus comprises a user interface for allowing a user to jointly set at least two high-pass image adjusting values ($\epsilon_n$) and/or at least one high-pass image adjusting value ($\epsilon_n$) and the low-pass image adjusting value ($\delta_N$) using an adjusting function or a look-up table.

5. The apparatus of claim 1 wherein the apparatus comprises a cross-fading unit for generating a cross-faded image being a cross-fading of the input image and of the adjusted image.

6. The apparatus of claim 5 wherein the apparatus comprises a user interface for allowing the user to set a cross-fading value (c) representing the strength of the input image or of the adjusted image in the cross-faded image.

7. The apparatus of claim 6 wherein the cross-fading unit is further adapted for generating the cross-faded image using functions (fHP1(c), fHP2(c), . . . , fHPN(c), fLPN(c)) of the cross-fading value (c), wherein a respective function (fHPn (c), fLPN(c)) of the cross-fading value (c) represents the strength of a respective high-pass image (HPn) or of a respective adjusted high-pass image (HPn*) or of the low-pass image (LPN) or of the adjusted low-pass image (LPN*) in the cross-faded image.

8. The apparatus of claim 1 wherein the high-pass image adjusting values ($\epsilon_1, \epsilon_2, \ldots, \epsilon_N$) comprise multiplication factors and the low-pass image adjusting value ($\delta_N$) comprises an additive value.

9. The apparatus of claim 1 wherein the apparatus is adapted for performing the adjusting of the high-pass images (HP1, HP2, . . . , HPN) and of the low-pass image (LPN) on a graphics card.

10. The apparatus of claim 1 wherein the apparatus comprises a user interface for allowing a user to spatially shift respective high-pass images (HPn) and/or the low pass image (LPN) and/or respective adjusted high-pass images (HPn*) and/or the adjusted low-pass image (LPN*) relative to each other.

11. The apparatus of claim 1 wherein the input image is a digital mammogram.

12. A method for adjusting images, comprising:
decomposing an input image into high-pass images (HP1, HP2, . . . , HPN) and a low-pass image (LPN) and decomposing a further input image into further high-pass images (FH1, FHP2, . . . , FHPN) and a further low-pass image (FLPN);
determining high-pass image adjusting values ($\epsilon_1, \epsilon_2, \ldots, \epsilon_N$) for adjusting the high-pass images (HP1, HP2, . . . , HPN) and a low-pass image adjusting value ($\delta_N$) for adjusting the low-pass image (LPN), wherein the high-pass image adjusting values ($\epsilon_1, \epsilon_2, \ldots, \epsilon_N$) are determined based on statistical values derived from the high-pass images (HP1, HP2, . . . , HPN), wherein the high-pass image adjusting value ($\epsilon_n$) for a respective high-pass image (HPn) is determined by determining a multiplication factor between the statistical value derived from the respective high-pass image (HPn) and a corresponding statistical value derived from a corresponding further high-pass image (FHPn);
adjusting the high-pass images (HP1, HP2, . . . , HPN) using the high-pass image adjusting values ($\epsilon_1, \epsilon_2, \ldots, \epsilon_N$) and the low-pass image (LPN) using the low-pass image adjusting value ($\delta_N$); and
recomposing the adjusted high-pass images (HP1*, HP2*, . . . , HPN*) and the adjusted low-pass image (LPN*) into an adjusted image.

13. The method of claim 12, further comprising generating a cross-faded image and wherein the cross-faded image is a cross-fading of an input image and of a frequency-adjusted version of the input image, and wherein the respective strength of the input image and of the frequency-adjusted version of the input image in the cross-faded image is adjustable by a user for medical diagnostic assessment.

14. A non-transitory computer-readable storage medium containing computer instructions for adjusting images that, when executed on a computer, cause an apparatus as defined in claim 1 to perform a method comprising:
decomposing an input image into high-pass images (HP1, HP2, . . . , HPN) and a low-pass image (LPN) and decomposing a further input image into further high-pass images (FH1, FHP2, . . . , FHPN) and a further low-pass image (FLPN);
determining high-pass image adjusting values ($\epsilon_1, \epsilon_2, \ldots, \epsilon_N$) for adjusting the high-pass images (HP1, HP2, . . . , HPN) and a low-pass image adjusting value ($\delta_N$) for adjusting the low-pass image (LPN)), wherein the high-pass image adjusting values ($\epsilon_1, \epsilon_2, \ldots, \epsilon_N$) are determined based on statistical values derived from the high-pass images (HP1, HP2, . . . , HPN), wherein the high-pass image adjusting value ($\epsilon_n$) for a respective high-pass image (HPn) is determined by determining a multiplication factor between the statistical value derived from the respective high-pass image (HPn) and a corresponding statistical value derived from a corresponding further high-pass image (FHPn);

adjusting the high-pass images (HP1, HP2, . . . , HPN) using the high-pass image adjusting values ($\epsilon_1, \epsilon_2, \ldots, \epsilon_N$) and the low-pass image (LPN) using the low-pass image adjusting value ($\delta_N$); and recomposing the adjusted high-pass images (HP1*, HP2*, . . . , HPN*) and the adjusted low-pass image (LPN*) into an adjusted image.

\* \* \* \* \*